Figures 1, 2, 3:
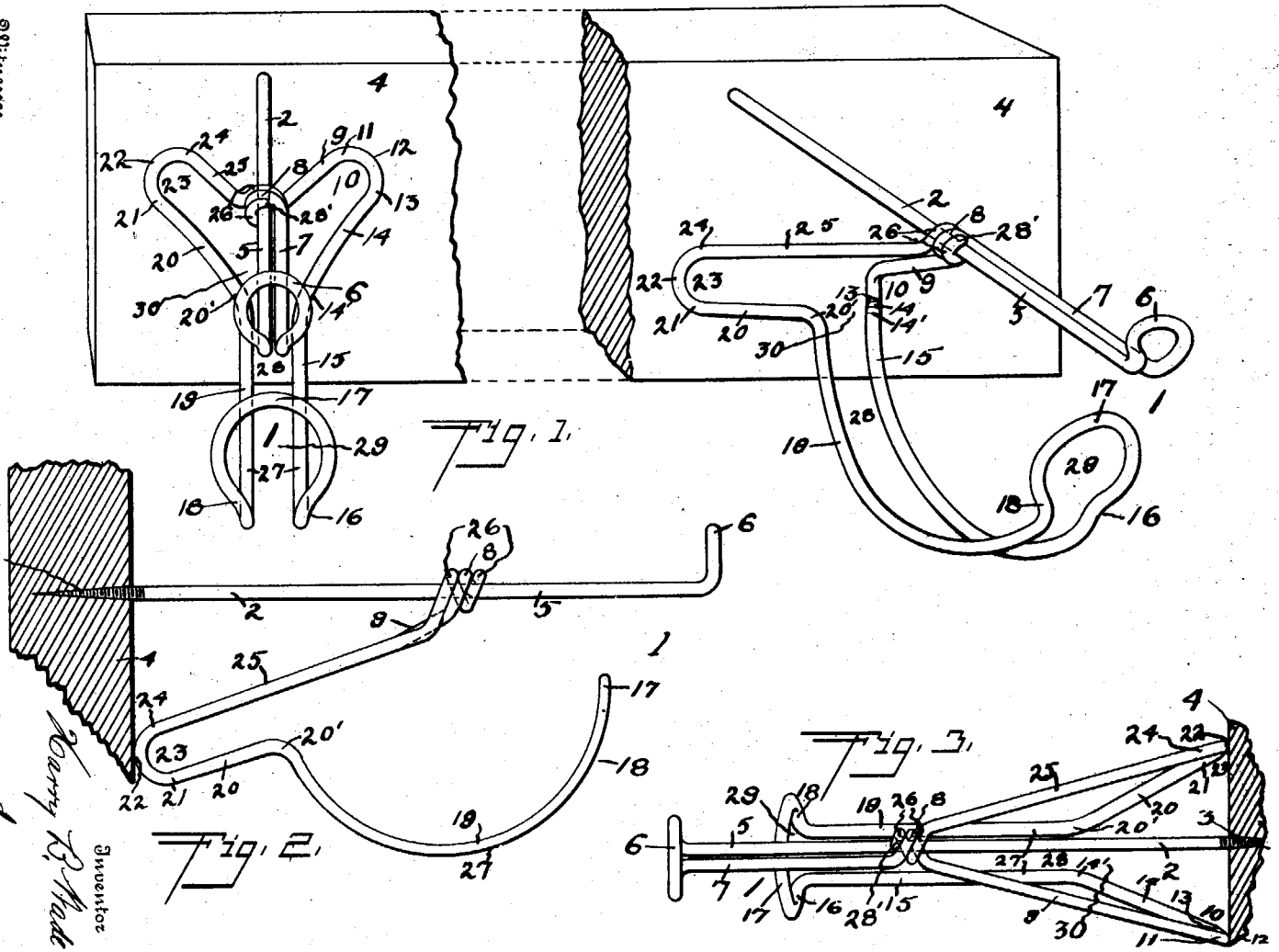

H. B. WADE.

COMBINATION HAT AND GARMENT HOOK.

APPLICATION FILED MAY 18, 1908.

Reissued July 27, 1909.

12,998.

2 SHEETS—SHEET 1.

Witnesses

M. R. Meacham

E. S. Dalton

Inventor

Harry B. Wade

By W. C. Adelmalk

Attorney

ANDREW B. GRAHAM CO., PHOTO-LITHOGRAPHERS, WASHINGTON, D. C.

H. B. WADE.

COMBINATION HAT AND GARMENT HOOK.

APPLICATION FILED MAY 18, 1908.

Reissued July 27, 1909.

12,998.

2 SHEETS—SHEET 2.

Inventor
Harry B. Wade

Witnesses
M. R. Meacham
E. S. Dalton

By
A. C. Hollingsworth
Attorney

ANDREW B. GRAHAM CO. PHOTO-LITHOGRAPHERS WASHINGTON, D. C.

UNITED STATES PATENT OFFICE.

HARRY B. WADE, OF OMAHA, NEBRASKA.

COMBINATION HAT AND GARMENT HOOK.

No. 12,998. Specification of Reissued Letters Patent. Reissued July 27, 1909.

Original No. 859,790, dated July 9, 1907, Serial No. 341,026. Application for reissue filed May 18, 1908. Serial No. 433,619.

*To all whom it may concern:*

Be it known that I, HARRY B. WADE, a citizen of the United States, residing at Omaha, in the county of Douglas and State of Nebraska, have invented certain new and useful Improvements in Combination Hat and Garment Hooks, of which the following is a specification.

This invention relates to a combined hat and garment hook.

One object of the invention is to provide a hook adapted for use in hanging trousers or skirts in such a manner as to preserve their form.

Another object of the invention resides in the provision of a pair of garment supporting hooks, each hook having a pair of arms adapted to support the buttons of garments and thereby efficiently suspend the garments between the hooks in such a manner as to effect a drawing or stretching of the garments in their suspended position.

Another object of the invention is to provide a pair of garment supporting hooks constructed and arranged to accommodate and maintain one or a series of garments, one of the hooks being arranged preferably higher than the other to maintain the garment or garments in true vertical position.

A still further object of the invention is to provide a pair of garment supporting hooks, each having a pair of arms spaced apart to provide a slot between them, the arms being curved and at each end diverging from each other to provide an opening at each end of the slot formed by each pair of arms to permit of the insertion of buttons of the garments in either direction into the said slot and supported by the arms against accidental displacement.

It is still further designed to provide a garment supporting hook including wings or brackets for bracing action against the wall or other support, the hook including a pair of curved arms spaced apart and also including a hat support arranged above the spaced arms.

With these and other objects in view, the invention presents a novel construction and formation of parts fully described herein, pointed out by the claims, and illustrated by the drawing, wherein:—

Figure 4:
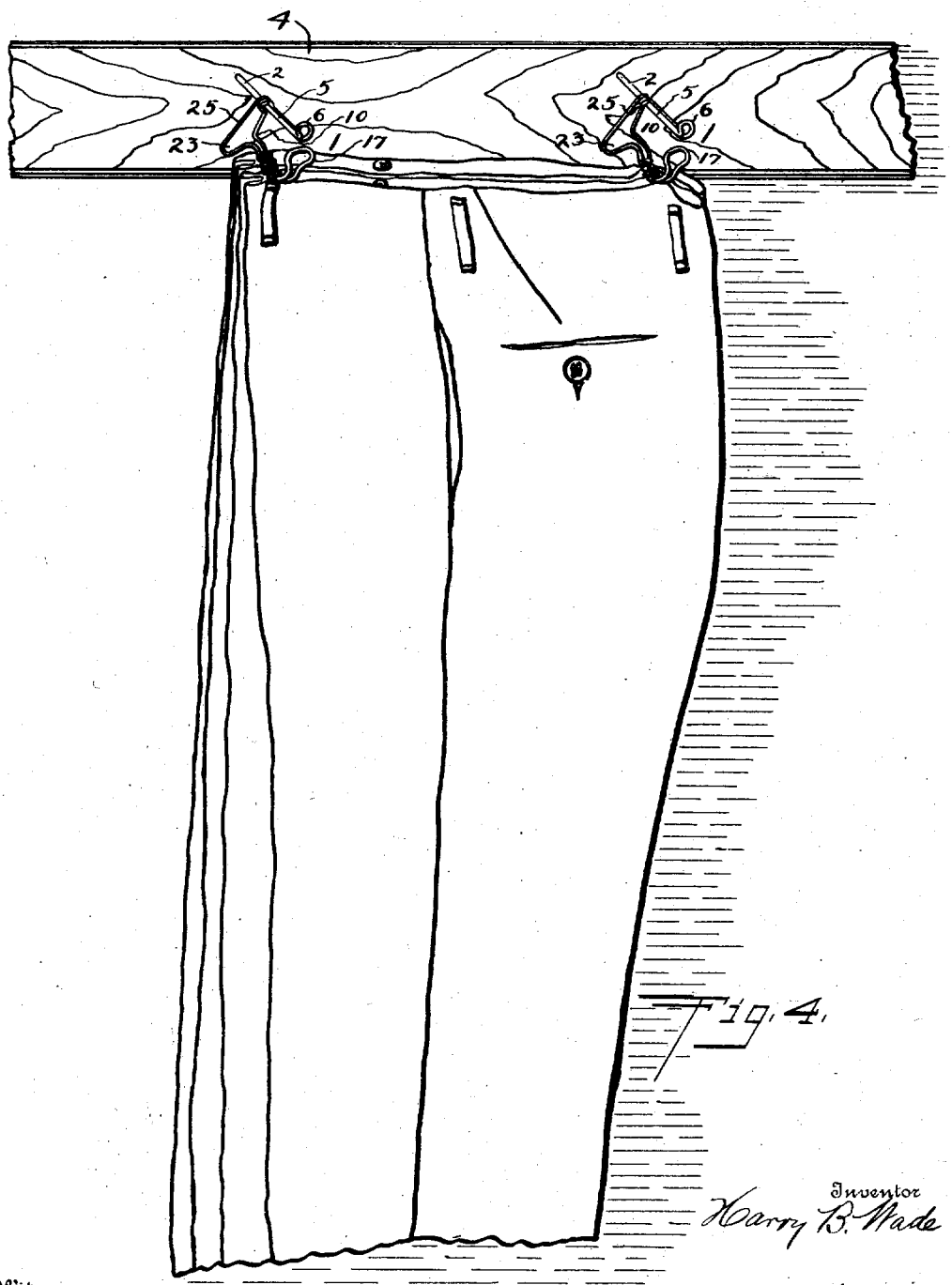

Figure 1 is a view of the complete invention, being a vertical presentation of a pair of hooks secured to a hook-rail or strip, the rail being shown in broken-away parts, one of the hooks being shown as a front view and the other in perspective. Fig. 2 is a side view of the invention secured in operative position. Fig. 3 is a top plan view of one of the hooks. Fig. 4 is a perspective view of a pair of hooks illustrating trousers suspended therefrom.

Referring now more particularly to the accompanying drawings, the numeral 1 represents a combination hat and garment hook preferably formed of a single strand or member, as a single piece of wire or the like having a shaft 2 provided with a screw-end 3 adapted to be secured to any convenient support, as to rail 4. The shaft is preferably formed as a straight member and extended on the same plane as the shaft, as an arm 5, and bent at its outer extremity to form the upwardly extending loop 6. From loop 6 the wire or member is returned parallel with arm 5, as arm 7, to shaft 2, and there bent into the coil or loop 8 and extended rearwardly, outwardly, with a downward inclination from shaft 2, and consequently divergently therefrom a suitable distance to form the arm 9 of wing 10, it being bent at 11 to form the base 12 of said wing 10. The wire is then bent at 13 and carried forward with an upward inclination, and convergingly with reference to shaft 2 and made to approach an adjacent vertical plane to shaft 2, thereby providing a supporting arm 14 which is bent at 14′ to form a forward and descending curve and continued to form the arm 15 of the pair of curved button holding arms 27, the wire being curved upwardly at 16 to form the upwardly extending button-receiving loop 17, from which point the wire is continued in a direction toward the rear to form a downwardly curved part 18 adjacent to and substantially coincident to the plane of the curved part 16, and continued as a curved arm 19 adjacent to and substantially coincident to the plane of the curved arm 15 and forming one of the pair of button-holding arms 27, and then bent at 20′ and formed divergently from an adjacent plane with shaft 2, with a downward inclination, as supporting arm 20, and bent at 21 to form the base 22 of wing 23. The wire is then bent at 24 and carried forward convergingly, with an upward inclination, as arm 25 of wing 23, to shaft 2, the plane of convergence described of arm 25 being substantially coincident to the planes occupied by arm 9, said arm 25 terminating in a coil 26 about shaft 2, this coil 26 embracing the coil 8 and terminating in end 28′, preferably contacting with arm 7 on the shaft.

As thus constructed, arms 25 and 9 extend rearwardly and divergently from the shaft, the wings 10 and 23, of which they are parts, operating as brackets; and when screw head 3 has entered the wall or rack, bases 12 and 22 rest thereon, and shaft 2 and all parts are thereby sustained in a rigid position. Loop 17 is of sufficient extent or width to admit the buttons of trousers or skirt, and the curved parts 15, 16, 18 and 19 constitute a pair of similarly curved button-holding arms 27 having therebetween the slot 28 with an enlargement 29 and 30 at each end, arms 27 and loop 17 being preferably flattened on their upper surfaces, as shown by Fig. 2, so that the buttons may readily slide thereon, or therefrom, and may rest upon the upper surface of arms 27, the garment to which the buttons are attached being below said arms. In other words, the connection between the button and garment passes through the slot, the button being held above the arms and the body of the garment hanging below the same. The garment may be removed from arms 27 by sliding the buttons to the rear as well as to the front since the curved parts 15 and 19 are, by the construction, located an ample space to the front of the bases 22 and 12, as shown in Fig. 2.

The hooks, as described, are used in pairs, as shown very clearly in Fig. 4, and are secured to the wall a suitable distance apart so that when the front of the trousers are folded in the usual well known manner, and the front suspender buttons upon each side of the garment are passed within the slot, each of the rear suspender buttons having been passed within the slot of the opposite hook, the distance apart of the hooks will cause a drawn or stretched position of the garment, which tends to preserve the form of the garment; and in practice, one of the hooks is secured to the wall at a somewhat higher altitude than its companion, so that the garment may have a vertical position while sustained.

Having quite fully described the parts, no particular statement of operation is required, and it will be sufficient to state that slot 28 is of sufficient length to receive therein the buttons of several trousers. The body of trousers are first folded so that the suspender buttons at the front are adjacent, as well as those at the rear of the garment, and as already stated, the hooks are employed in pairs and spaced apart on the wall, so that when the garment has been sustained, the body of the garment will be stretched horizontally between the hooks, other parts of the garment hanging dependingly below the hooks; and, therefore, the use of the device tends to preserve the form of the garment and the latter may be detached readily from either front or rear by simply sliding the buttons on the arms. Skirts may be sustained on a pair of the hooks in the same manner as trousers.

Loop 6 operates as a hat hook, and is preferably extended farther to the front than the button-loop, for obvious reasons. The device may be very economically constructed from a single piece of wire, and the button-holding arms are flattened after or at time of forming the hook. It will be noted that the curvature of arms 27 is sufficient to prevent the buttons from sliding therefrom, after a garment has been placed, except when manually moved to the front or to the rear.

It will be observed that the inclination and curvature of parts forming each side of the hook generally conform, arms 17 and 19 preferably being spaced an equal distance apart, substantially, throughout their length. It will be seen that, by reason of divergence of arms 14 and 20, buttons may be passed from arms 27 and the garment removed from the rear of the hook. The enlargement or opening 29 formed by loop 17 is sufficiently large to receive buttons of any required size which may be used upon the garments mentioned.

I have described the manner of forming the entire hook which I consider the best, and have given full details, but do not limit myself thereto, and it is considered that minor details of construction may be varied without departing from the scope of the invention.

What I claim as my invention is,—

1. In combination, a hook of the class described, comprising a sustaining-shaft; wing members; each of said wing members being composed of a metal strand secured upon the sustaining shaft and extended downwardly, divergently and rearwardly from the sustaining shaft and passed forwardly and convergingly to complete the formation of said wings and passed forwardly from said wings to form a pair of curved, adjacently-disposed holding-arms.

2. In combination, a hook of the class described, comprising a sustaining shaft; wing members; each of said wing members being composed of a metal strand secured upon the sustaining-shaft and extended downwardly, divergently and rearwardly from the sustaining-shaft and passed forwardly, upwardly and convergingly to complete the formation of said wings, and passed forwardly from said wings to form a pair of curved, adjacently-disposed holding-arms.

3. In combination, a hook of the class described, comprising a sustaining shaft; wing members; each of said wing members being composed of a metal strand secured upon the sustaining-shaft and extending downwardly, divergently and rearwardly from the sustaining-shaft and passed forwardly and convergingly to complete the formation of said wings, and passed forwardly from said wings to form a pair of curved holding-arms; the arms of said pair of curved holding-arms being disposed in a manner to form a slot therebetween, and united at their outer extremity to form an opening of greater width than the width of said slot.

4. In combination, a hook of the class described, comprising a sustaining-shaft; wing members; each of said wing members comprising a metal strand secured upon the sustaining-shaft and extended downwardly, divergently and rearwardly from the sustaining-shaft and passed forwardly, upwardly and convergingly to complete the formation of said wings, and passed forwardly from said wings to form a pair of curved holding-arms; the arms of said pair of curved holding-arms being disposed in a manner to form a slot therebetween and united at their outer extremity to form an opening of greater width than the width of said slot.

5. In combination, a hook of the class described, comprising a sustaining-shaft; wing members; each of said wing members being composed of a metal strand secured upon the sustaining-shaft and extended downwardly, divergently and rearwardly from the sustaining-shaft and passed forwardly and convergingly to complete the formation of said wings, and passed forwardly from said wings to form a pair of curved holding-arms; the arms of said pair of curved holding-arms being disposed in a manner to form a slot therebetween, and united at their outer extremity to form an opening of greater width than the width of said slot; said sustaining shaft being extended lengthwise and forwardly beyond the plane of the wings and above said holding-arms to form an outwardly-extending sustaining member.

6. In combination, a hook of the class described, comprising a sustaining-shaft; wing members; each of said wing members being composed of a metal strand secured upon the sustaining-shaft and extended downwardly, divergently and rearwardly from the sustaining-shaft and passed forwardly, upwardly and convergingly to complete the formation of said wings, and passed forwardly, from said wings to form a pair of curved holding-arms; the arms of said pair of curved holding-arms being disposed in a manner to form a slot therebetween, and united at their outer extremity to form an opening of greater width than the width of said slot; said sustaining-shaft being extended lengthwise and forwardly beyond the plane of said wings and beyond and above the plane of said holding-arms to form an outwardly-extending sustaining member.

7. A garment supporting hook comprising a sustaining-shaft and a pair of supporting arms connected with said shaft and arranged to form a slot between them, the said supporting arms diverging at each end of the slot an amount sufficient to permit a garment button to be passed between the same, whereby the connection between the button and the garment may pass through the slot, the button being held above the arms and the body of the garment hanging below the same.

8. A garment supporting hook comprising a sustaining-shaft and a pair of supporting arms connected with said shaft and arranged to form a slot between them, the said supporting arms diverging at each end of the slot an amount sufficient to permit a garment button to be passed between the same, whereby the connection between the button and the garment may pass through the slot, the button being held above the arms and the body of the garment hanging below the same, the portions of the arms between which the slot is formed being disposed below the divergent portions thereof.

9. A garment supporting hook comprising a sustaining-shaft, and a pair of downwardly curved supporting arms connected with said shaft and arranged to form a slot between them, the said supporting arms diverging at a portion of the slot an amount sufficient to permit a garment button to be passed between the same, whereby the connection between the button and garment may pass through the slot, the button being held above the arms and the body of the garment hanging below the same.

10. A garment supporting hook comprising a sustaining-shaft adapted for connection with a support, and a pair of curved supporting arms connected with said shaft and spaced apart to form a slot between them, the said arms diverging at one end of the slot an amount sufficient to permit a garment button to be passed between the same, whereby the connection between the button and garment may pass through the slot, the button being held above the arms and the body of the garment hanging below the same, the portions of the arms between which the slot is formed being disposed below the divergent portions thereof to prevent accidental displacement of the garment with relation to the hook.

11. In combination with a support, a pair of garment supporting hooks adjacently disposed on said support, each of said hooks comprising a shaft connected with the support and a pair of supporting arms connected with said shaft and spaced apart to form a slot between them, the said slot having a widened portion adapted to admit a garment button thereto, one of the hooks being disposed higher than the other and the arrangement of both hooks upon the support being such that a portion of the garment may be supported by each of the hooks and the body of the garment stretched and hung vertically between the same.

12. In combination with a support, a pair of garment supporting hooks adjacently disposed on said support, each of said hooks comprising a shaft connected with the support, and a pair of curved supporting arms connected with said shaft and spaced apart to form a slot between them, the opposite ends of the arms diverging an amount sufficient to permit a garment button to pass between the same, whereby the connections between the corresponding buttons and the garment may be passed through the corresponding slot, the buttons thereby held above the arms and the body of the garment to hang below the same, the portions of the arms between said diverging portions being disposed below the latter to prevent accidental displacement of the garment.

13. A hook of the class described comprising a sustaining-shaft, wing members extending downwardly, divergingly and rearwardly from the sustaining-shaft and terminating in a pair of curved holding arms spaced apart to form a slot between them.

14. A hook of the class described comprising a sustaining-shaft, wing members extending downwardly, divergingly and rearwardly from the sustaining-shaft and terminating in a pair of curved holding arms spaced apart to form a slot between them, the arms diverging from each other at each end to provide a space of sufficient width to permit a garment button to pass between the same, whereby the connection between the button and garment may pass through the slot, the button being held above the arms and the garment hanging below the same.

15. A hook of the class described comprising a sustaining-shaft, wing members extended downwardly, divergently and rearwardly from the sustaining-shaft and terminating in a pair of curved adjacently disposed holding arms spaced apart to form a slot between them, said arms having diverging portions to provide a space of sufficient width to permit a garment button to be passed between the same, whereby the connection between the button and garment may be passed through the slot from either end of the arm with the button held above the arms and the body of the garment hanging below the same.

16. A hook of the class described comprising a sustaining-shaft, wing members extended downwardly, divergently and rearwardly from the sustaining-shaft and terminating in a pair of curved adjacently disposed holding arms spaced apart to form a slot between them, said arms having diverging portions to provide a space of sufficient width to permit a garment button to be passed between the same, whereby the connection between the button and garment may be passed through the slot from either end of the arm with the button held above the arms and the body of the garment hanging below the same, the portions of the arms between which the slot is formed being disposed below the divergent portions thereof to prevent accidental displacement of the buttons of the garments from said slot.

17. A hook of the class described comprising a sustaining-shaft, wing members extending downwardly, divergingly and rearwardly from the sustaining-shaft and terminating in a pair of curved holding arms spaced apart to form a slot between them, said holding arms diverging at a point in their length to provide a space wider than the remaining portion of the slot.

18. In combination with a support, a combined hat and garment hook including a sustaining-shaft for engagement with said support, and a pair of curved holding arms disposed beneath the sustaining-shaft, said arms being spaced apart to form a slot between them, and elements between the arms and sustaining-shaft for engagement with said support to brace the hook.

19. In combination with a support, a combined hat and garment hook including a sustaining-shaft for engagement with said support, and a pair of curved holding arms disposed beneath the sustaining - shaft, said arms being spaced apart to form a slot between them, and elements between the arms and sustaining shaft for engagement with said support to brace the hook, said arms diverging at a point to form an opening of greater width than the width of the remaining portion of the slot.

In testimony whereof I have affixed my signature in presence of two witnesses.

HARRY B. WADE.

Witnesses:
D. O. BARNELL,
C. R. McKAY.